(12) United States Patent
Sugiura et al.

(10) Patent No.: US 8,506,143 B2
(45) Date of Patent: Aug. 13, 2013

(54) MOLDING FOR VEHICLE

(75) Inventors: Izuru Sugiura, Kariya (JP); Akiyoshi Mori, Chita (JP); Daisuke Kudoh, Kasugai (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 778 days.

(21) Appl. No.: 12/292,628

(22) Filed: Nov. 21, 2008

(65) Prior Publication Data

US 2009/0134661 A1 May 28, 2009

(30) Foreign Application Priority Data

Nov. 22, 2007 (JP) .................................. 2007-302435

(51) Int. Cl.
*B60Q 1/00* (2006.01)
*B60Q 1/26* (2006.01)

(52) U.S. Cl.
USPC ........................................................ 362/501

(58) Field of Classification Search
USPC ........................................................ 362/501
See application file for complete search history.

(56) References Cited

U.S. PATENT DOCUMENTS

| 5,193,895 | A | * | 3/1993 | Naruke et al. | 362/542 |
|---|---|---|---|---|---|
| 6,160,475 | A | * | 12/2000 | Hornung et al. | 340/461 |
| 6,252,500 | B1 | * | 6/2001 | Chueh et al. | 340/472 |
| 2005/0073852 | A1 | * | 4/2005 | Ward | 362/501 |
| 2005/0285717 | A1 | * | 12/2005 | Ieda et al. | 340/5.72 |
| 2009/0051517 | A1 | * | 2/2009 | Suzuki | 340/438 |

FOREIGN PATENT DOCUMENTS

| DE | 39 08 995 | 7/1990 |
|---|---|---|
| DE | 41 04 119 | 8/1992 |
| DE | 42 27 242 | 2/1994 |
| DE | 196 06 540 | 11/1996 |
| DE | 203 12 518 | 8/2003 |
| DE | 10 2005 026 807 | 12/2006 |
| JP | 2003-212038 | 7/2003 |
| JP | 2007-190990 | 8/2007 |

OTHER PUBLICATIONS

European Search Report Feb. 20, 2009.

* cited by examiner

*Primary Examiner* — David J Makiya
(74) *Attorney, Agent, or Firm* — Finnegan, Henderson, Farabow, Garrett & Dunner, LLP

(57) ABSTRACT

A molding for a vehicle includes a molding body provided at a door of the vehicle, at least one light-emitting body provided inside an end portion of the molding body for notifying an occupant of a state of the door, and a light-transmitting portion provided at the molding body for transmitting light emitted by the light-emitting body.

12 Claims, 7 Drawing Sheets

F I G. 6
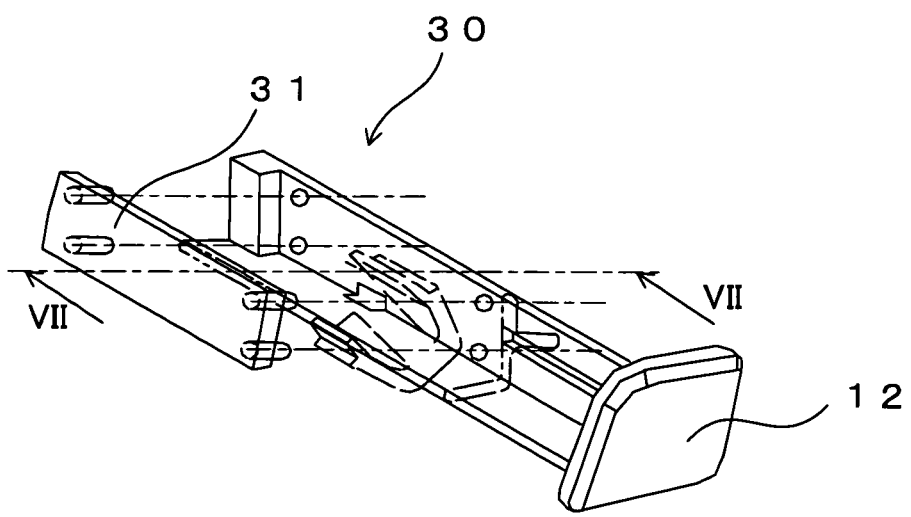

MOLDING FOR VEHICLE

CROSS REFERENCE TO RELATED APPLICATIONS

This application is based on and claims priority under 35 U.S.C. §119 to Japanese Patent Application 2007-302435, filed on Nov. 22, 2007, the entire content of which is incorporated herein by reference.

FIELD OF THE INVENTION

The present invention relates to a molding for a vehicle.

BACKGROUND

Conventionally, an automatic opening or closing operation of a door of a vehicle is notified by a buzzer (a beeping sound). The buzzer cannot notify an occupant of an opening or closing direction of the door. The buzzer cannot notify the occupant of an opening or closing velocity of the door either. Further, the sound emitted by the buzzer can be an annoying noise when in a residential block, in a parking lot of an apartment building, or the like, at night.

In order to overcome the foregoing problem, JP2007-190990A discloses a sliding door apparatus, which can notify drivers of an oncoming car, a following car, or the like, of a moving direction of a door moving in a thickness direction of the sliding door by sequentially blinking a light-emitting body. The oncoming car, the following car, or the like, can see an opening or closing state of the door on the basis of a blinking state of the light-emitting body.

The known sliding door apparatus includes the light-emitting body provided at a link arm and notifies of a movement of the door in a thickness direction of the door to the oncoming car, the following car, or the like. However, for notifying an occupant of the opening or closing operation of the door in a sliding direction of the door, the light-emitting body should be provided on a front surface of the door at a position that can be seen by the occupant. Obtaining a new installation space of the light-emitting body on the front surface of the door is difficult in the context of design and cost because a design change of a door body is required.

A need thus exists for a molding for a vehicle which is not susceptible to the drawback mentioned above.

SUMMARY OF THE INVENTION

In light of the foregoing, the present invention provides a molding for a vehicle, which includes a molding body adapted to be mounted to a door of the vehicle, at least one light-emitting body provided inside an end portion of the molding body for notifying an occupant of a state of the door, and a light-transmitting portion provided at the molding body for transmitting light emitted by the light-emitting body.

BRIEF DESCRIPTION OF THE DRAWINGS

The foregoing and additional features and characteristics of the present invention will become more apparent from the following detailed description considered with the reference to the accompanying drawings, wherein:

FIG. 6 is an exploded view illustrating a molding for a vehicle according to a second embodiment of the present invention.

DETAILED DESCRIPTION

Figure 1:
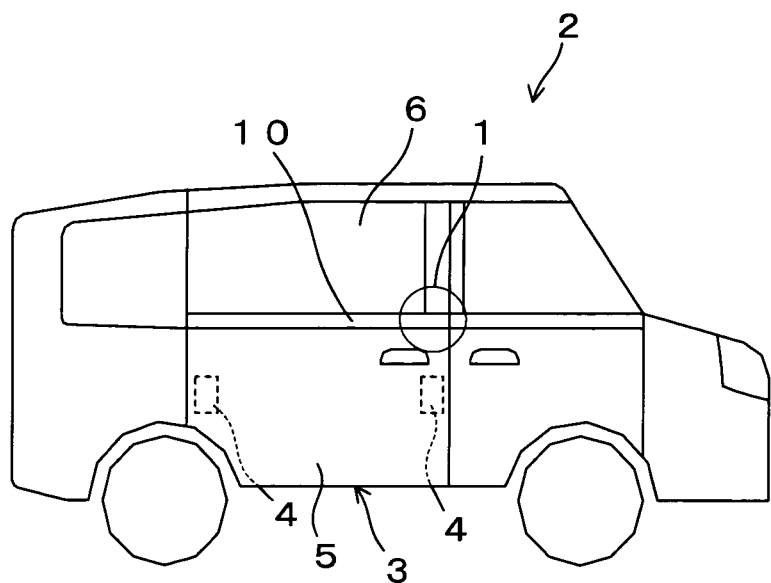
FIG. 1 is a side view illustrating a vehicle including a molding for a vehicle according to a first embodiment of the present invention.

A first embodiment of the present invention will be explained in detail with reference to drawing figures. FIG. 1 is a side view illustrating a vehicle 2 including a molding 1 for the vehicle 2 according to the first embodiment of the present invention. A sliding door 3 (door), which automatically opens and closes, is provided at a side surface of the vehicle 2. The sliding door 3 includes a lock 4 built within the sliding door 3. The molding 1 for the vehicle 2 is provided at the sliding door 3 at an end portion of a belt molding 10 (molding body) between a sliding door body 5 and a windowpane 6.

Figure 2:
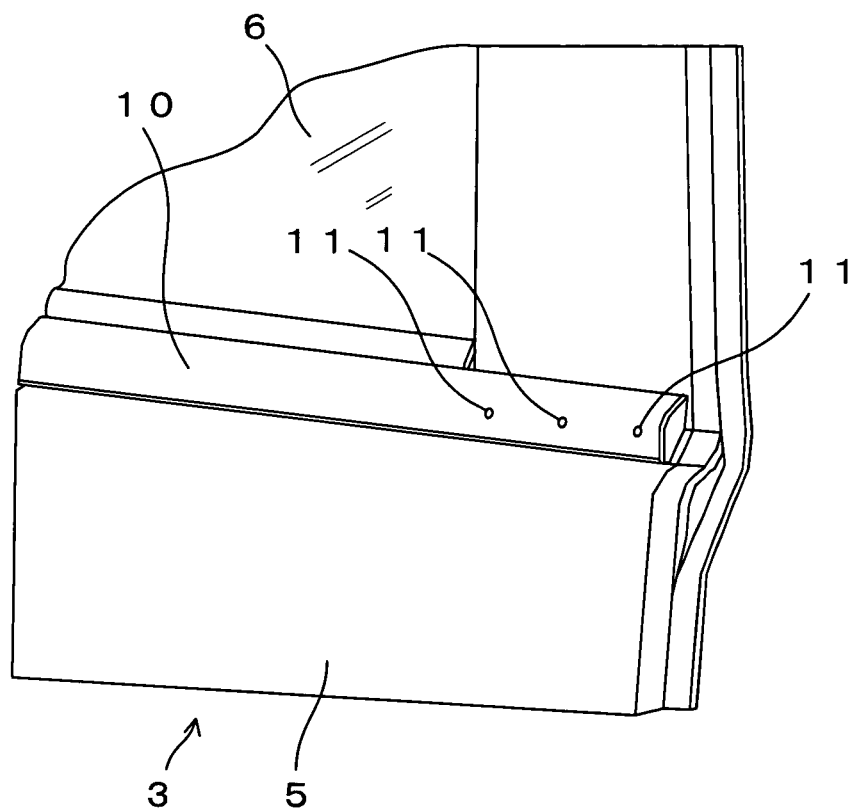
FIG. 2 is an enlarged view illustrating a state that the molding for the vehicle according to the first embodiment of the present invention is attached to a sliding door.

FIG. 2 is an enlarged view illustrating a state that the molding 1 for the vehicle 2 is attached to the sliding door 3. Three small light-transmitting holes 11 (light-transmitting portion), of which a diameter is approximately 1.5 mm, are provided at the end portion of the belt molding 10, which does not interfere with an up-and-down operation of the windowpane 6. The light-transmitting holes 11 are serially arranged in line in a length direction of the belt molding 10.

Figure 3:
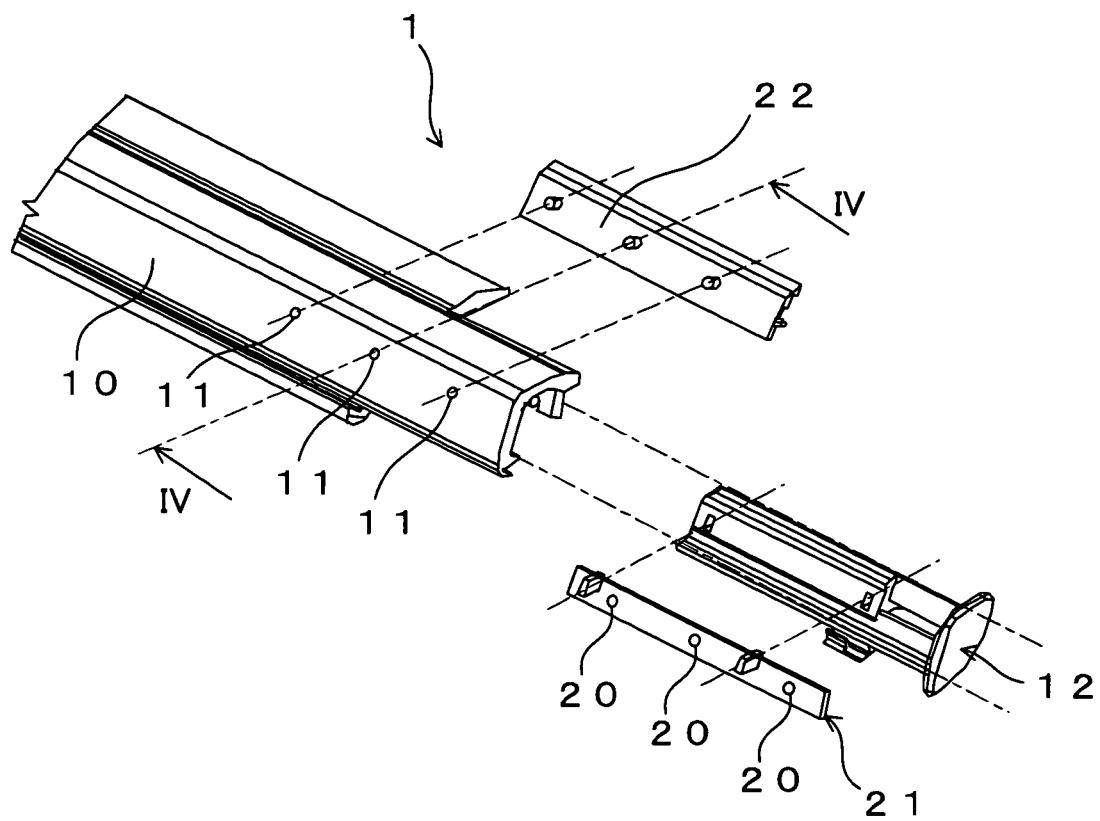
FIG. 3 is an exploded view illustrating the molding for the vehicle according to the first embodiment of the present invention.

FIG. 3 is an exploded view illustrating the molding 1 for the vehicle 2. An end cap 12 is provided at the end portion of the belt molding 10. The end cap 12 is slid in a length direction of the belt molding 10 when the end cap 12 is assembled with the belt molding 10.

A light-emitting diode unit 21, which includes three light-emitting diodes 20 (light-emitting body), is attached to the end cap 12. Each of the light-emitting diodes 20 is provided at a position that faces each of the light-transmitting holes 11. A light-transmitting plate 22 is fitted into each of the light-transmitting hole 11.

Figure 4:
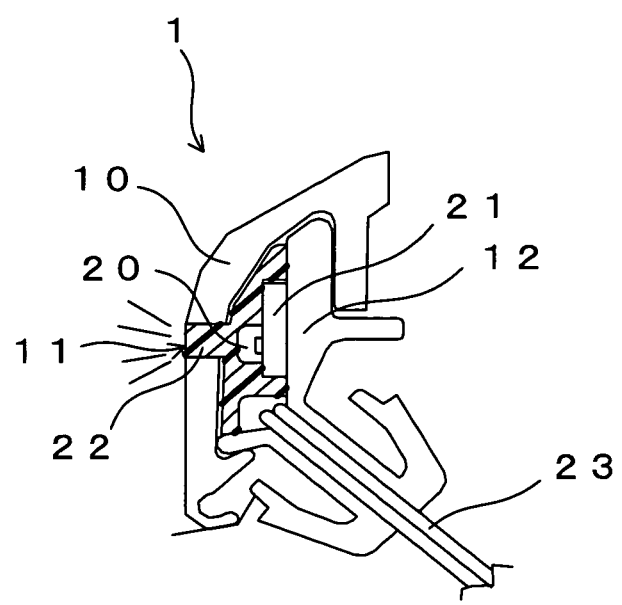
FIG. 4 is a cross-sectional view illustrating an assembled state of the molding for the vehicle according to the first embodiment of the present invention taken along line IV-IV of FIG. 3.

FIG. 4 is a cross-sectional view illustrating an assembled state of the molding 1 for the vehicle 2 taken along line IV-IV of FIG. 3. The light-emitting diodes 20 emit light by the electricity supplied from a harness 23 provided at the light-emitting diode unit 21. The light-transmitting plate 22 is provided between the light-emitting diode 20 and the belt molding 10. Light emitted from the light-emitting diode 20 is introduced through the light-transmitting plate 22 and spreads from each of the light-transmitting holes 11 to an outside of the belt molding 10.

Figure 5:
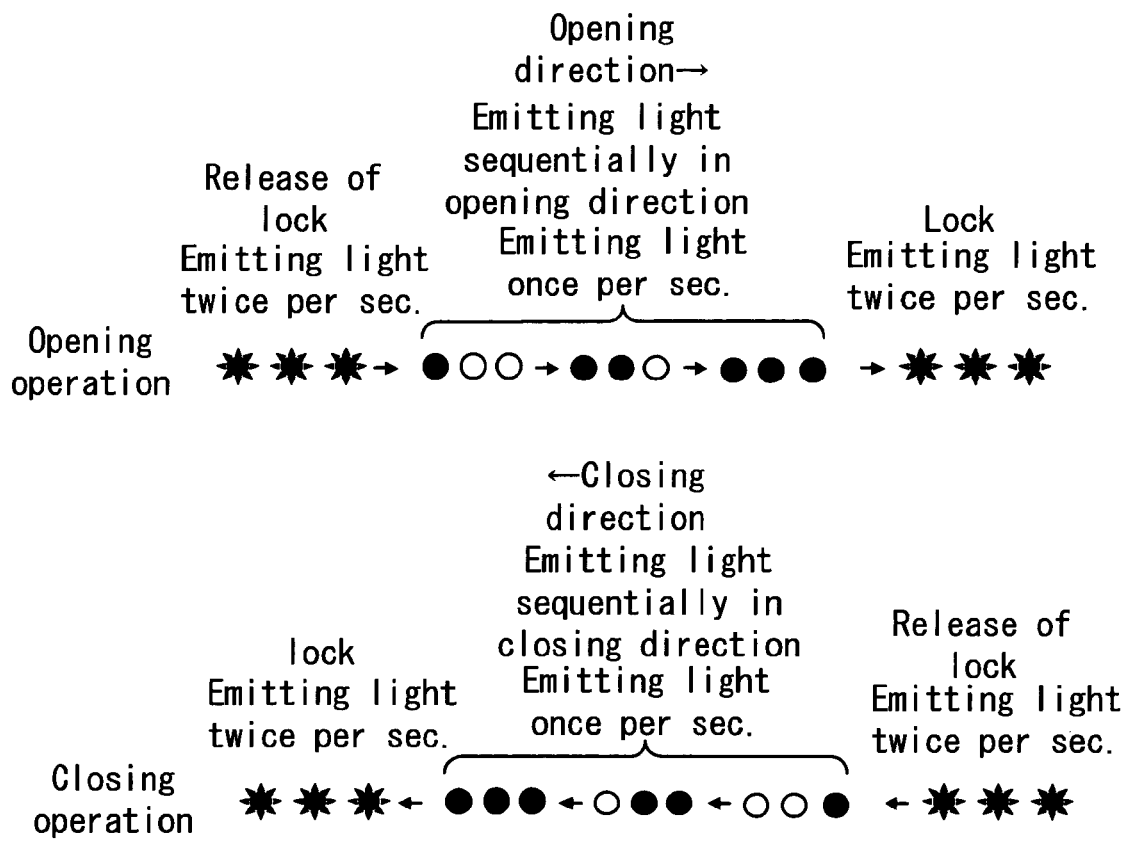
FIG. 5 is an explanatory diagram illustrating a lighting pattern of the molding for the vehicle according to the first embodiment of the present invention.

FIG. 5 is an explanatory view illustrating a lighting pattern of the molding 1 for the vehicle 2.

A lighting pattern at the time of an opening operation of the sliding door 3 will be explained. Before the sliding door 3 opens, the three light-emitting diodes 20 blink twice a second at the same time to notify of a release of the lock 4. Next, in cooperation with the opening operation of the sliding door 3, the three light-emitting diodes 20 sequentially emit light in an opening direction of the sliding door 3 once a second. When the sliding door 3 reaches an entirely opened position, three light-emitting diodes 20 blink twice a second at the same time to notify of a locking of the lock 4.

A lighting pattern at the time of a closing operation of the sliding door 3 will be explained. Before the sliding door 3 closes, the three light-emitting diodes 20 blink twice a second at the same time to notify of a release of the lock 4. Next, in cooperation with the closing operation of the sliding door 3, the three light-emitting diodes 20 sequentially emit light in a closing direction of the sliding door 3 once a second. When the sliding door 3 reaches an entirely closed position, the three light-emitting diodes 20 blink twice a second at the same time to notify of a locking of the lock 4.

Here, the sequential emission of light has been explained taking an example of a case where the sliding door 3 opens or closes at a constant speed. In a case where the opening or closing speed of the sliding door 3 changes, for example, when the opening or closing speed is fast, the three light-emitting diodes 20 sequentially emit light once for 0.5 seconds to notify an occupant that the opening or closing speed is fast.

In the molding 1 for the vehicle 2 according to the first embodiment of the present invention, the light-emitting diodes 20 are provided at the belt molding 10 of the sliding door 3 at a position that can be seen by an occupant. The sequential emission of light of the light-emitting diodes 20 notifies the operation (opening or closing direction, opening or closing speed) of the sliding door 10. Accordingly, the operation of the sliding door 3 can be notified to an occupant without emitting a sound of a buzzer. Therefore, in a residential block, in a parking lot of an apartment building, or the like, at night, producing buzzer sound can be avoided and the operation of the sliding door 3 can be notified to the occupant by the light emitted by the light-emitting diodes 20. Accordingly, a problem of a making noise by the buzzer at night can be solved. Further, the light-emitting diodes 20 are provided inside the belt molding 10 at a position that can be seen by an occupant. Accordingly, a design change of the sliding door body 5 is not required. Therefore, design is not degraded and costs for the design change of the sliding door body 5 are not required.

Further, because the opening or closing operation of the sliding door 3 can preliminarily be notified to the occupant by the light emitted by the light-emitting diodes 20 before the sliding door 3 starts the opening or closing operation, safety can be enhanced. Further, because the release or locking of the lock 4 is notified by the light-emitting diodes 20 provided in the belt molding 10, an occupant can confirm the release or locking of the lock 4 at night without emission of light from hazard flashers, directional indicators, or the like, which have a high intensity of illumination.

Further, because the light-transmitting plate 22 is provided between the light-emitting diode 20 and the belt molding 10, light spreads from the small light-transmitting hole 11 of the belt molding 10 to an outside. Accordingly, the light emitted by the light-emitting diodes 20 can easily be seen by the occupant. Further, because the light-emitting diodes 20 are not seen directly through the light-transmitting hole 11, the design is not degraded.

Further, because the light-emitting diodes 20 are provided as a unit with the end cap 12, which is slid and fit to an opening portion of an end portion of the belt molding 10, interference of the light-emitting diodes 20 with the windowpane 6 provided at the sliding door 3 can be prevented. Further, because the light-emitting diodes 20 are slid in a length direction of the belt molding 10 to be assembled, the light-emitting diodes 20 can be easily assembled with the belt molding 10. Further, because a joint seam, or the like, to attach the light-emitting diodes 20, is not required for the belt molding 10, a design, a sealing, or the like, can be improved.

Further, in a case where a combination of light-emitting diodes of three colors (red, green, and blue) (RGB) are utilized for the light-emitting diodes 20, different colors can be utilized for indicating different operations of the sliding door 3. For example, a blue light-emitting diode emits light at the time of the opening operation of the sliding door 3 and a red light-emitting diode emits light at the time of the closing operation of the sliding door 3. By doing so, the occupant can easily distinguish the opening or closing operation of the door on the basis of the color of the light emitted by the light-emitting diodes 20.

Further, in the first embodiment, explanations have been made taking an example of a case where the molding 1 for the vehicle 2 is provided in the belt molding 10 of the sliding door 3. However, a position of the molding 1 for the vehicle 2 to be provided is not limited to the belt molding 10. Further, the molding 1 for the vehicle 2 can be applied to, instead of the sliding door 3, for example, to a swinging door, a back door, or the like.

Figure 7:
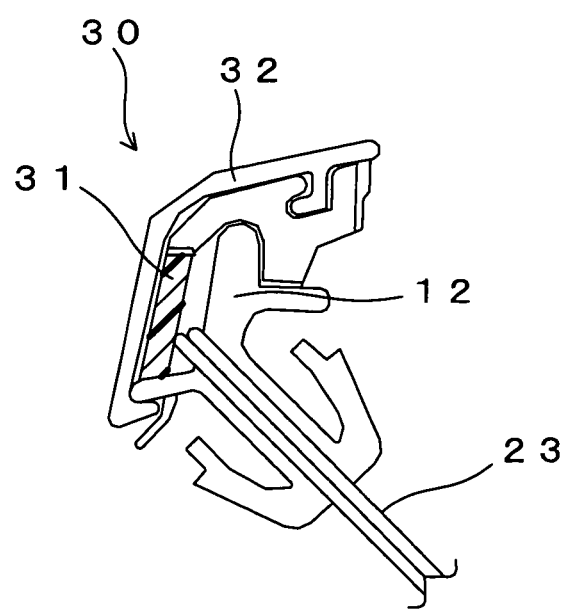
FIG. 7 is a cross-sectional view illustrating an assembled state of the molding for the vehicle according to the second embodiment of the present invention taken along line VII-VII of FIG. 6.

A second embodiment of the present invention will be explained with reference to drawing figures. FIG. 6 is an exploded view illustrating a molding 30 for a vehicle according to the second embodiment of the present invention. FIG. 7 is a cross-sectional view illustrating the molding 30 for the vehicle according to the second embodiment of the present invention. A difference between the molding 30 for the vehicle according to the second embodiment and the molding 1 for the vehicle 2 according to the first embodiment of the present invention is that an organic electroluminescence unit 31 (organic EL unit; light-emitting body) is utilized instead of the light-emitting diode unit 21. Common components to the first embodiment will be explained with use of common reference numerals.

FIG. 6 is an exploded view illustrating the molding 30 for the vehicle according to the second embodiment of the present invention. The organic EL unit 31 is attached to the end cap 12. FIG. 7 is a cross-sectional view illustrating an assembled state of the molding 30 for the vehicle taken along line VII-VII of FIG. 6. The organic EL unit 31 emits light by the electricity supplied from a harness 23. A part of the belt molding 32, which faces the organic EL unit 31, is made from a member, which transmits light. Accordingly, a light emission display of the organic EL unit 31 can be seen from an outside of the belt molding 32.

In the molding 30 for the vehicle according to the second embodiment of the present invention, instead of the display by the lighting pattern (sequential emission, or the like) of the light-emitting body, for example, an arrow diagram, a letter sign, or the like, can be utilized to notify an occupant of an opening or closing direction and an opening or closing speed of the sliding door 3. Further, because the part of the belt molding 32, the part facing the organic EL unit 31, is made from a member, which transmits light, the light-transmitting hole 11 is not required. Accordingly, a sealing of the molding 30 for the vehicle against rainwater, or the like, from an outside can be improved. Further, the organic EL has a small dimension and can be provided along a curved surface. Accordingly, the organic EL can be provided along a curved surface of the belt molding 32.

According to the embodiments of the present invention, the light-emitting body 20 is provided at an end portion of the molding body 10 of the door 3 for notifying an occupant of a state of the door 3. The end portion of the molding body 10 of the door 3 can be seen by the occupant and does not interfere with an up-and-down operation of a windowpane 6. Accordingly, the molding for the vehicle can notify the occupant of an operation of the door 3 without emitting a sound of a buzzer. Therefore, in a residential block, a parking lot of an apartment building, or the like, at night, producing a sound by the buzzer can be avoided and an operation of the door 3 can be notified to the occupant by light emitted by the light-emitting body 20. By doing so, a noise is not made. Further, because the light-emitting body 20 is provided in the molding body 10, which can be seen by the occupant, a design change of the door body is not required and the molding for the vehicle can be applied to an existing door body. Accordingly, the design is not degraded and costs for a design change of the door body are not required. Further, interference with the windowpane 6 can be inhibited.

According to the embodiments of the present invention, the door 3 automatically opens and closes, and the light-emitting body 20 notifies the occupant of at least either one of an opening or closing direction of the door 3 or an opening or closing speed of the door 3 in cooperation with an opening or closing operation of the door 3.

According to the embodiments of the present invention, an operation of the door 3 can be notified to the occupant without a sound emitted by the buzzer. Therefore, in a residential block, a parking lot of an apartment building, or the like, at night, a producing sound by the buzzer can be avoided and an operation of the door 3 can be notified to the occupant by light emitted by the light-emitting body 20. By doing so, a noise is not made. Further, because the light-emitting body 20 is provided in the molding body 10, which can be seen by the occupant, a design change of the door body is not required and the molding for the vehicle can be applied to an existing door body. Accordingly, a design is not degraded and costs for a design change of the door body are not required.

According to the embodiments of the present invention, the light-emitting body 20 notifies an occupant of at least either one of a release or a lock of the door 3.

According to the embodiments of the present invention, because an opening or closing operation of the door 3 can preliminarily be notified to the occupant by the light-emitting body 20 before the door 3 starts the opening or closing operation, safety can be enhanced. Further, because the release or locking of the lock is notified by the light-emitting body 20 provided at the molding body 10, an occupant can confirm the release or locking of the lock at night without emission of light from hazard flashers, directional indicators, or the like, which have a high intensity of lights.

According to the embodiments of the present invention, the molding for the vehicle further includes an end cap 12 which is slid and fit in an axial direction from an end portion of the molding body 10, and the light-emitting body 20 is attached to the end cap 12.

According to the embodiments of the present invention, the light-emitting body 20 can be easily assembled with the molding body 10. Therefore, assembling time can be decreased. Further, because attaching or detaching of the light-emitting body 20 from the molding body 10 is easy, the light-emitting body 20 can easily be exchanged.

According to the embodiments of the present invention, at least three light-emitting bodies 20 are arranged in line in an axial direction of the molding body 10, and the plural light-emitting bodies 20 emit lights sequentially to notify the occupant of at least either one of the opening or closing direction or the opening or closing speed of the door.

According to the embodiments of the present invention, at least either one of the opening or closing direction or the opening or closing speed of the door 3 can be notified to the occupant by a sequential emission of light by the light-emitting bodies 20.

According to the embodiments of the present invention, the light-transmitting portion is a light-transmitting hole 11 facing each of the light-emitting bodies 20 provided at the molding body 10.

According to the embodiments of the present invention, the light-transmitting hole 11 can be made by drilling an existing molding body 10.

According to the embodiments of the present invention, the light-emitting body includes at least one light-emitting diode 20.

According to the embodiments of the present invention, plural light-emitting diodes 20 can be provided in a limited space of the end portion of the molding body 10. Further, because the light-emitting diodes 20 generate small heat, a thermal influence to the molding body can be diminished.

According to the embodiments of the present invention, a light-transmitting plate 22 is provided between the light-emitting diode 20 and the molding body 10, and light emitted from the light-emitting diode 20 is introduced through the light-transmitting hole 11 via the light-transmitting plate 22 to an outside of the molding body 10.

According to the embodiments of the present invention, light emitted by the light-emitting diode 20, which advances straight, spreads when the light is introduced by the light-transmitting plate 22 from the light-transmitting hole 11 to an outside. Therefore, light emitted by the light-emitting diode 20 can be seen easily by the occupant. Further, because the light-transmitting plate 22 is provided, the light-emitting diode 20 is not seen directly through the light-transmitting hole 11. Therefore, the design is not degraded.

According to the embodiments of the present invention, the light-emitting body 20 includes an organic electroluminescence 31.

According to the embodiments of the present invention, an arrow diagram, a letter sign, or the like, can be utilized to notify the occupant of an opening or closing direction and an opening or closing speed of the door 3. Further, because the organic electroluminescence 31 has a small dimension and can be provided along a curved surface, the organic electroluminescence can be provided along a curved surface of the molding body 10.

According to the embodiments of the present invention, the light-transmitting portion 11 is a member which transmits light, and the member which transmits light faces at least the organic electroluminescence 31 provided at the molding body 10.

According to the embodiments of the present invention, the light-transmitting hole is not required. Therefore, a sealing against rainwater, or the like, from an outside can be improved.

According to the embodiments of the present invention, the molding body is a belt molding 10 provided between the door 3 and a windowpane 6.

According to the embodiments of the present invention, the molding for the vehicle can be provided at the belt molding 10 between the door 3 and the windowpane 6.

According to the embodiments of the present invention, the door 3 is either one of a sliding door or a swinging door.

According to the embodiments of the present invention, a state of at least either one of the sliding door or a swinging door can be notified to the occupant.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A molding for a vehicle, comprising:
   a molding body adapted to be mounted to a door of the vehicle, wherein the door automatically opens and closes;
   at least one light-emitting body provided inside an end portion of the molding body for notifying an occupant of an opening or closing speed of the door in cooperation with an opening or closing operation of the door, the light-emitting body including at least one light-emitting diode;
   a light-transmitting portion provided at the molding body for transmitting light emitted by the light-emitting body, the light-transmitting portion being a plurality of holes facing the light-emitting body; and
   an end cap slidingly inserted in an axial direction into the molding body from the end portion,
   wherein the light-emitting body is attached to the end cap, and
   wherein a light-transmitting plate is provided between the light-emitting diode and the molding body, the light-transmitting plate is fitted into each of the plurality of holes, and light emitted from the light-emitting diode is introduced through the plurality of light-transmitting holes via the light-transmitting plate to an outside of the molding body.

2. The molding for the vehicle according to claim 1, wherein
   the light-emitting body notifies the occupant of an opening or closing direction of the door.

3. The molding for the vehicle according to claim 1, wherein
   the light-emitting body notifies the occupant of at least either one of a release or a lock of the door.

4. The molding for the vehicle according to claim 2, wherein at least three light-emitting bodies are arranged in line in an axial direction of the end cap and the plural light-emitting bodies emit lights sequentially in one of a plurality of predetermined lighting patterns to notify the occupant of at least either one of the opening or closing direction, the opening or closing speed of the door, or the locking or unlocking of the door.

5. The molding for the vehicle according to claim 1, wherein
   the light-emitting body includes an organic electroluminescence.

6. The molding for the vehicle according to claim 5, wherein
   the light-transmitting portion is a member which transmits light, and the member which transmits light faces at least the organic electroluminescence provided at the molding body.

7. The molding for the vehicle according to claim 1, wherein
   the molding body is a belt molding provided between the door and a windowpane.

8. The molding for the vehicle according to claim 1, wherein
   the door is either one of a sliding door or a swinging door.

9. The molding for the vehicle according to claim 1, wherein the light-emitting body blinks in accordance with an opening or closing speed of the door.

10. The molding for the vehicle according to claim 1, wherein the light-emitting body blinks such that an emitting interval of the light-emitting body is changed in accordance with a change of an opening or closing speed of the door.

11. The molding for the vehicle according to claim 1, wherein the light-emitting body includes a plurality of light-emitting diodes having a plurality of colors.

12. The molding for the vehicle according to claim 11, wherein the different color light-emitting diodes emit light in accordance with at least one of the opening or closing of the door.

* * * * *